US007655326B2

(12) United States Patent
Torigoe et al.

(10) Patent No.: US 7,655,326 B2
(45) Date of Patent: Feb. 2, 2010

(54) THERMAL BARRIER COATING MATERIAL AND METHOD FOR PRODUCTION THEREOF, GAS TURBINE MEMBER USING THE THERMAL BARRIER COATING MATERIAL, AND GAS TURBINE

(75) Inventors: Taiji Torigoe, Hyogo-ken (JP); Kazutaka Mori, Hyogo-ken (JP); Ikuo Okada, Hyogo-ken (JP); Sunao Aoki, Hyogo-ken (JP); Kouji Takahashi, Hyogo-ken (JP); Minoru Ohara, Hyogo-ken (JP); Takehiko Hirata, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 262 days.

(21) Appl. No.: 10/478,690

(22) PCT Filed: Jun. 14, 2002

(86) PCT No.: PCT/JP02/05945

§ 371 (c)(1),
(2), (4) Date: Dec. 8, 2003

(87) PCT Pub. No.: WO02/103074

PCT Pub. Date: Dec. 27, 2002

(65) Prior Publication Data

US 2004/0156724 A1 Aug. 12, 2004

(30) Foreign Application Priority Data

Jun. 15, 2001 (JP) ............................ 2001-181831

(51) Int. Cl.
*B32B 15/04* (2006.01)
*B32B 18/00* (2006.01)

(52) U.S. Cl. .................................. 428/701; 416/241 B

(58) Field of Classification Search ...................... None
See application file for complete search history.

(56) References Cited

U.S. PATENT DOCUMENTS

| | | | | |
|---|---|---|---|---|
| 4,377,371 | A | 3/1983 | Wisander et al. | |
| 5,073,433 | A | 12/1991 | Taylor | |
| 5,525,559 | A * | 6/1996 | Metcalfe et al. | 501/103 |
| 6,180,262 | B1 | 1/2001 | Freling et al. | |
| 6,319,615 | B1 | 11/2001 | Jansen | |
| 6,333,118 | B1 | 12/2001 | Alperine et al. | |
| 6,812,176 | B1 * | 11/2004 | Zhu et al. | 501/102 |
| 2005/0221109 | A1 * | 10/2005 | Torigoe et al. | 428/633 |

FOREIGN PATENT DOCUMENTS

| | | | |
|---|---|---|---|
| EP | 437154 | | 7/1991 |
| EP | 825271 | A1 * | 2/1998 |
| JP | 60-190580 | | 9/1985 |

(Continued)

*Primary Examiner*—John J. Zimmerman
*Assistant Examiner*—Aaron Austin
(74) *Attorney, Agent, or Firm*—Oblon, Spivak, McClelland, Maier & Neustatd, L.L.P.

(57) ABSTRACT

A thermal barrier coating material, containing a metal binding layer laminated on a base material and a ceramic layer laminated on the metal binding layer, the ceramic layer comprising partially stabilized $ZrO_2$ which is partially stabilized by additives of $Dy_2O_3$ and $Yb_2O_3$.

15 Claims, 7 Drawing Sheets

FOREIGN PATENT DOCUMENTS

| | | | | |
|---|---|---|---|---|
| JP | 63-38565 | | | 2/1988 |
| JP | 63038565 | A | * | 2/1988 |
| JP | 09327779 | A | * | 12/1997 |
| JP | 2000-144365 | | | 5/2000 |
| JP | 2000144365 | A | * | 5/2000 |
| JP | 2000-301655 | | | 10/2000 |
| WO | 91/05886 | | | 5/1991 |
| WO | WO 9942630 | A1 | * | 8/1999 |

* cited by examiner

THERMAL BARRIER COATING MATERIAL AND METHOD FOR PRODUCTION THEREOF, GAS TURBINE MEMBER USING THE THERMAL BARRIER COATING MATERIAL, AND GAS TURBINE

TECHNICAL FIELD

The invention relates to a thermal barrier coating material, a method of production thereof, and a gas turbine member and a gas turbine to which the thermal barrier coating material is applied, and relates to useful arts which are applicable, for example, to thermal barrier coatings for rotor blades and stator blades of industrial gas turbines as well as for combustors and other parts used in high-temperature environments.

BACKGROUND ART

Since high-temperature parts, such as rotor blades and stator blades of industrial gas turbines, and flame tubes, tail pipes, and split rings of combustors, etc., are used in high-temperature environments, they are generally provided with a thermal barrier coating on the surface.

FIG. 11 is a sectional view of a conventional thermal barrier coating.

The conventional thermal barrier coating film is arranged by laminating a metal binding layer 12 of MCrAlY alloy on a base material 11 of a rotor blade or the like and then further laminating a $ZrO_2$ (zirconia)-based ceramic layer 13, for example, a layer of a partially stabilized $ZrO_2$ which is partially stabilized by the addition of $Y_2O_3$ at a proportion of 6 to 8 wt % (hereinafter referred to as "YSZ") on the metal binding layer 12 as a topcoat. Herein, the M in MCrAlY represents a solitary element or a combination of two or more elements selected from Ni, Co, Fe and the like.

However, for recent gas turbines the turbine entrance temperature has been increasing and thus higher thermal barrier properties are being demanded of topcoats. Also, thermal stress due to the thermal expansion difference between the metal base material 11 and the $ZrO_2$-based ceramic layer increases as the turbine entrance temperature increases. This thermal stress causes peeling of the topcoat and leads to degradation of the durability of the thermal barrier coating film. Improvements are thus needed to prevent the peeling of the topcoat.

Attempts have been already made to produce a $ZrO_2$-based ceramic of columnar crystal form by the application of an electron beam physical vapor deposition in the process of laminating the topcoat ceramic layer 13. Attempts have also been made to produce microcracks in the thickness direction of a $ZrO_2$-based ceramic while forming the $ZrO_2$-based ceramic by thermal spraying. According to these methods, the peeling of the topcoat can be prevented since the thermal stress caused between the base material 11 and the ceramic layer 13 is alleviated.

Also, a partially stabilized $ZrO_2$ which is partially stabilized by addition of $Dy_2O_3$ in place of $Y_2O_3$ (hereinafter referred to as "DySZ") is gathering attention as a ceramic material which is approximately 20% lower than YSZ in thermal conductivity.

DISCLOSURE OF THE INVENTION

However, since the application process for the electron beam physical vapor deposition requires a large amount of time, application to a large-scale gas turbine or the like is difficult in terms of cost. Since the thermal conductivity of the obtained film becomes approximately 30% greater than that of porous ceramic, the film thickness must be made large, thus presenting a further difficulty in use. As for the method of laminating the ceramic layer while forming the microcracks by thermal spraying, the formation of the microcracks requires a dense ceramic layer, leading to the problem that the topcoat is increased in thermal conductivity and thus lowered in thermal barrier property. Furthermore, the microcracks are frequently formed not only in the thickness direction but also in the layer direction, leading to the problem that the ceramic layer peels in layers.

Moreover, DySZ is approximately 10% lower in linear thermal expansion coefficient than YSZ. Thus, when a topcoat of thermal barrier coating film is formed of DySZ, though a higher thermal barrier property can be obtained in comparison to the case where YSZ is used, the peeling resistance may become lower.

Regarding use of stabilized zirconia as a material for thermal spraying in an application of thermal barrier coating (TBC), there is a known method wherein after electromelting zirconia and yttria powders at 2500° C. or higher, the ingot obtained is pulverized to a mean particle diameter of 40 to 80 μm to produce a powder of stabilized zirconia for thermal spraying. There is another method wherein zirconia and yttria powders are mixed in a slurry form, formed into spherical grains using a spray dryer, and then heated to produce a powder stabilized zirconia powder for thermal spraying. However, in these methods, the mixing of zirconia and yttria is not uniform due to the diffusion rate of zirconia being slower and the like. Thus, it is difficult to produce completely stabilized zirconia. That is, whereas completely stabilized zirconia should be tetragonal crystals, some monoclinic zirconia remains. Although the monoclinic zirconia undergoes a phase modification to tetragonal crystals at 1000° C., thermal stress can arise in the interior due to the difference in thermal expansion coefficients of monoclinic crystals and tetragonal crystals.

The present invention has been made in view of the above circumstances and an object of the first aspect of the invention is to provide a thermal barrier coating material, wherein a topcoat of the thermal barrier coating material is a ceramic layer which is porous and has microcracks that extend in a thickness direction, thereby providing both a high thermal barrier property and a high peeling resistance, and a method of producing the thermal barrier coating material.

Another object of the first aspect of the invention is to provide a gas turbine member which is adequately durable even in the environments of higher temperature than those of conventional temperatures, by an application of the thermal barrier coating material which provides both a higher thermal barrier property and a higher peeling resistance.

An object of the second aspect of the invention is to provide a thermal barrier coating material which provides both a higher thermal barrier property and a higher peeling resistance in comparison to the material in which YSZ is used as a topcoat.

Another object of the second aspect of the invention is to provide a gas turbine member that is adequately durable even in the environments of higher temperature than those of conventional temperatures, by an application of the thermal barrier coating material which provides both a higher thermal barrier property and a higher peeling resistance in comparison to the material in which YSZ is used as a topcoat.

An object of the third aspect of the invention is to provide, as a TBC raw material for thermal spraying, a stabilized zirconia powder being high in stability wherein particles of a rare earth oxide such as yttria are mixed uniformly with zirconia particles.

In achieving the above objects, the present inventors considered that the topcoat of a porous ceramic is effective for securing a higher thermal barrier property. The present inventors also considered that microcracks that extend in the thickness direction in the ceramic layer are effective for securing a higher peeling resistance. As a result of diligent research, they came to complete the first aspect of the invention.

The present inventors also paid attention to partially stabilized $ZrO_2$ which is partially stabilized by $Yb_2O_3$ (hereinafter referred to as "YbSZ"). Since YbSZ has a 10 to 20% greater linear expansion coefficient than YSZ or DySZ, it presents the possibility of providing a higher peeling resistance. That is, the present inventor considered that a composite material of DySZ and YbSZ, DySZ being higher in thermal barrier effect than YSZ and YbSZ being higher in peeling resistance than YSZ, can be used effectively as a topcoat and came to complete the second aspect of the invention as a result of diligent research.

Furthermore, the present inventors paid attention to the specific surface areas of zirconium and rare earth oxide powders to be combined to form the TBC raw material for thermal spraying and came to complete the third aspect of the invention.

That is, the thermal barrier coating material of the first aspect of the invention is characterized in that a metal binding layer is laminated on a base material, and a ceramic layer of partially stabilized $ZrO_2$ which is porous and has microcracks that extend in the thickness direction, is laminated on the metal binding layer. According to the invention, the porosity of the porous portion of the ceramic layer may be in the range of 1% to 30%. The density of the porous portion may be in the range of 4 g/mm$^3$ to 6.5 g/mm$^3$. The thermal conductivity of the ceramic layer may be in the range of 0.5 w/m·K to 5 w/m·K. The number of the microcracks per unit length (1 mm) of a section of the ceramic layer may be in the range of 1 to 10.

According to this thermal barrier coating material, since the topcoat is the ceramic layer comprising the partially stabilized $ZrO_2$ which is porous and yet has microcracks that extend in the thickness direction, a high thermal barrier effect comparable to conventional porous materials can be provided, while a high peeling resistance comparable to materials obtained by the electron beam physical vapor deposition can be also provided. The thermal barrier coating material, which can provide an adequate thermal barrier effect and durability even in the environments of higher temperatures than those of conventional temperatures, is thus provided.

The method for producing the thermal barrier coating material of the first aspect of the invention comprises the steps of: laminating a metal binding layer on a surface of a base material, laminating a ceramic layer on a surface of the metal binding layer, and causing microcracks which extend in the thickness direction in the ceramic layer by irradiating a surface of the ceramic layer with a laser beam and thereby heating the surface of the ceramic layer while cooling a rear surface of the base material. According to the invention, the surface of the ceramic layer may be irradiated with a laser beam with a diameter in the range of 10 mm to 40 mm. The surface of the ceramic layer may be heated to a temperature in the range of 1000° C. to 1700° C. by irradiation with the laser beam. Irradiation with the laser beam may be carried out from 5 to 1000 times with the proviso that neither phase modification nor sintering of the partially stabilized $ZrO_2$ will occur.

In the production method, the ceramic layer is laminated so that the porosity may be in the range of 1% to 30% or the density may be in the range of 4 g/mm$^3$ to 6.5 g/mm$^3$. Or, the microcracks are caused so that the thermal conductivity may be in the range of 0.5 w/m·K to 5 w/m·K, or the number of the microcracks per unit length (1 mm) of a section of the ceramic layer may be in the range of 1 to 10.

According to the method for producing the thermal barrier coating material, since microcracks are caused in the ceramic layer by laser beam irradiation after lamination of the ceramic layer, the thermal barrier coating material can be formed extremely simply in a short period of time and at low cost. This method may also be applied selectively to only thermally severe parts of a gas turbine member and the like.

The gas turbine member of the first aspect of the invention is characterized in being covered with a thermal barrier coating film produced by laminating a metal binding layer on a base material and laminating a ceramic layer on the metal binding layer, the ceramic layer comprising a partially stabilized $ZrO_2$ which is porous and has microcracks that extend in the thickness direction. According to the invention, the porosity of the porous portion of the ceramic layer may be in the range of 1% to 30%. The density may be in the range of 4 g/mm$^3$ to 6.5 g/mm$^3$. The thermal conductivity of the ceramic layer may be in the range of 0.5 w/m·K to 5 w/m·K. The number of the microcracks per unit length (1 mm) of a section of the ceramic layer may be in the range of 1 to 10.

According to this gas turbine member, since the topcoat of the thermal barrier coating film is the ceramic layer comprising the partially stabilized $ZrO_2$ which is porous and yet has microcracks that extend in the thickness direction, and the gas turbine member is covered with the thermal barrier coating film, the gas turbine member provides an adequate thermal barrier effect and durability even in environments of higher temperature than those of conventional temperatures.

According to the first aspect of the invention, provided is the gas turbine which generates motive power by expanding, by means of stator and rotor blades of the turbine, a fluid that has been compressed by a compressor and then combusted by a combustor. The gas turbine is characterized in that either or both of the stator and rotor blades are covered with a thermal barrier coating film, produced by laminating a metal binding layer on a base material of the blade and laminating a ceramic layer on the metal binding layer, the ceramic layer comprising partially stabilized $ZrO_2$ which is porous and has microcracks that extend in the thickness direction. The ceramic layer preferably satisfies one or more of the following conditions (1) to (4):

(1) The porosity of the porous portion of the ceramic layer is in the range of 1% to 30%.

(2) The density of the porous portion of the ceramic layer is in the range of 4 g/mm$^3$ to 6.5 g/mm$^3$.

(3) The thermal conductivity of the ceramic layer is in the range of 0.5 w/m·K to 5 w/m·K.

(4) The number of the microcracks per unit length (1 mm) of a section of the ceramic layer is in the range of 1 to 10.

According to the second aspect of the invention, the thermal barrier coating material is characterized in that a metal binding layer is laminated on a base material and a ceramic layer is laminated on the metal binding layer, the ceramic layer comprising partially stabilized zirconia which is partially stabilized by the additives of $Dy_2O_3$ and $Yb_2O_3$. According to the invention, the added proportion of the $Dy_2O_3$ may be in the range of 0.01 wt % to 16.00 wt %, the added proportion of the $Yb_2O_3$ may be in the range of 0.01 wt % to 17.00 wt %, the sum of the added proportions of $Dy_2O_3$ and $Yb_2O_3$ may be in the range of 10 wt % to 20 wt %, and the added proportion of $ZrO_2$ may be in the range of 80 wt % to 90 wt %. Moreover, the ceramic layer may be a film produced by thermal spraying of a $ZrO_2$—$Dy_2O_3$—$Yb_2O_3$ powder obtained by mixing $ZrO_2$, $Dy_2O_3$ and $Yb_2O_3$ powders and forming a solid solution of this mixture.

According to this thermal barrier coating material, since the topcoat comprises a composite material of DySZ and YbSZ, DySZ being higher in thermal barrier effect than YSZ and YbSZ being higher in peeling resistance than YSZ, a thermal barrier effect and a peeling resistance which are higher in comparison to the prior art can be provided. The thermal barrier coating material, which provides an adequate durability even in environments of higher temperature than those of conventional temperatures, can thus be provided.

The gas turbine member according to the second aspect of the invention is characterized by being covered with a thermal barrier coating film which is produced by laminating a metal binding layer on a base material and laminating a ceramic layer on the metal binding layer. The ceramic layer comprises partially stabilized zirconia which is partially stabilized by adding $Dy_2O_3$ and $Yb_2O_3$. According to the invention, the $Dy_2O_3$ may be added in the range of 0.01 wt % to 16.00 wt %, the $Yb_2O_3$ may be added in the range of 0.01 wt % to 17.00 wt %, the sum of the added $Dy_2O_3$ and $Yb_2O_3$ may be in the range of 10 wt % to 20 wt %, and the $ZrO_2$ may be added in the range of 80 wt % to 90 wt %. The ceramic layer may be a film produced by thermal spraying of a $ZrO_2$—$Dy_2O_3$—$Yb_2O_3$ powder produced by mixing $ZrO_2$, $Dy_2O_3$ and $Yb_2O_3$ powders and forming a solid solution of this mixture, or a film produced by the electron beam physical vapor deposition. A vacuum heat treatment for realizing good adhesion of the undercoat with the base material may be performed in the final step.

According to this gas turbine member, since the topcoat of the thermal barrier coating film comprises a composite material of DySZ and YbSZ, DySZ being higher in thermal barrier effect than YSZ, and YbSZ being higher in peeling resistance than YSZ, and since the gas turbine member is covered with the thermal barrier coating film, the gas turbine member having an adequate durability even in environments of higher temperature than those of conventional temperatures can be provided.

Moreover, the second aspect of the invention provides the gas turbine which generates motive power by expanding, by means of stator and rotor blades of the turbine, a fluid which has been compressed by a compressor and then combusted by a combustor. The gas turbine is characterized in that either or both of the stator and rotor blades are covered with a thermal barrier coating film produced by laminating a metal binding layer on a base material of the blades and laminating a ceramic layer on the metal binding layer. The ceramic layer comprises partially stabilized $ZrO_2$ which is partially stabilized by adding $Dy_2O_3$ and $Yb_2O_3$. The gas turbine preferably satisfies one or two or more of the following conditions (1) to (3):

(1) The added $Dy_2O_3$ is in the range of 0.01 wt % to 16.00 wt %, the added $Yb_2O_3$ is in the range of 0.01 wt % to 17.00 wt %, the sum of the added $Dy_2O_3$ and $Yb_2O_3$ is in the range of 10 wt % to 20 wt %, and the $ZrO_2$ which is other than the stabilizers is added in the range of 80 wt % to 90 wt %.

(2) The ceramic layer is a film produced by thermal spraying of a $ZrO_2$—$Dy_2O_3$—$Yb_2O_3$ powder produced by mixing $ZrO_2$, $Dy_2O_3$ and $Yb_2O_3$ powders and forming a solid solution of this mixture.

(3) The ceramic layer is a film produced by the electron beam physical vapor deposition of an ingot having a predetermined composition.

According to the third aspect of the invention, provided is the TBC raw material for thermal spraying, prepared by adding a zirconia powder and a rare earth oxide powder, each powder having a specific surface area of at least 10 $m^2/g$ powder. Also provided is the method of producing the TBC raw material for thermal spraying wherein a zirconia powder having a specific surface area of at least 10 $m^2/g$ and a rare earth oxide powder having a specific surface area of at least 10 $m^2/g$ are mixed along with a suitable binder or dispersant to be made into a slurry, then granulated to form the particles having an average particle diameter of 10 to 100 μm, and then heated at 1300 to 1600° C. for 1 to 10 hours. Also provided is the gas turbine member which has been covered with the film obtained by thermal spraying of the TBC raw material for thermal spraying, and the gas turbine comprising this gas turbine member.

BEST MODE FOR CARRYING OUT THE INVENTION

An embodiment of the thermal barrier coating according to the first aspect of the invention will be explained.

Figure 1:
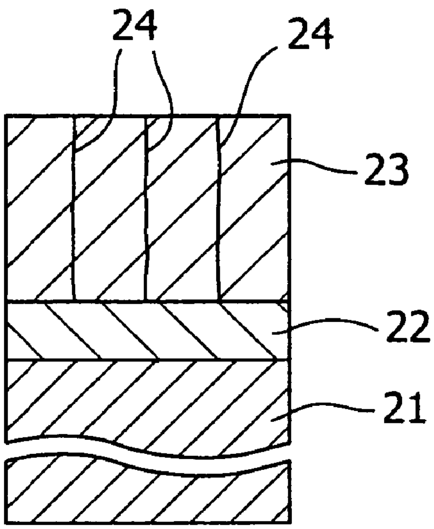
FIG. 1 is a sectional view of the thermal barrier coating film according to the first aspect of the invention.

FIG. 1 is a sectional view of the thermal barrier coating film to which the thermal barrier coating material according to the first aspect of the invention is applied.

The thermal barrier coating film has a structure wherein an MCrAlY alloy layer is laminated as a metal binding layer 22 of excellent corrosion resistance and oxidation resistance on a base material 21 such as a rotor blade, and a $ZrO_2$-based ceramic layer 23, which is partially stabilized by one or two selected from the group consisting of $Y_2O_3$, $Dy_2O_3$ and $Yb_2O_3$, is laminated further on the metal binding layer 22 as a topcoat. The ceramic layer 23 is porous and comprises microcracks 24 which extend in the thickness direction.

The metal binding layer 22 has a role in lowering the difference of thermal expansion coefficient between the base material 21 and the porous $ZrO_2$-based ceramic layer 23 and thereby relaxing thermal stress so that the ceramic layer 23 is prevented from peeling off from the base material 21. Herein, the M in the MCrAlY alloy represents a solitary element or a combination of two or more elements selected from Ni, Co, Fe and the like.

In the porous $ZrO_2$-based ceramic layer 23, the porosity of the porous portion is preferably in the range of 1% to 30%. This is because when the porosity is less than 1%, the thermal conductivity may be significantly high so that the thermal barrier effect may be low. When the porosity is greater than 30%, the mechanical strength of the ceramic layer may degrade significantly so that the thermal cycle resistance may be poor. The porosity can be measured by an image analysis of a sectional microstructure.

Moreover, the density of the porous portion of the ceramic layer 23 is preferably in the range of 4 $g/mm^3$ to 6.5 $g/mm^3$. This is because when the density is less than 4 $g/mm^3$, the mechanical strength of the film may be low. When the density is more than 6.5 $g/mm^3$, the film may be dense and large in thermal conductivity so that the film may be poor in thermal barrier property.

The thermal conductivity of the ceramic layer 23 is preferably in the range of 0.5 w/m·K to 5 w/m·K. This is because when the thermal conductivity is more than 5 w/m·K, the merit of a thermal barrier coating may be insufficient. When the thermal conductivity is less than 0.5 w/m·K, a large number of pores have been introduced so that the film may be low in mechanical strength and poor in thermal cycle resistance. This thermal conductivity can be measured by a laser flash method, which is generally used for this type of thermal conductivity measurement.

The number of microcracks 24 per unit length (1 mm) of a section of ceramic layer 23 is preferably in the range of 1 to 10. This is because when there is less than 1 crack per 1 mm, the thermal stress due to the difference of linear expansion coefficient may not be eased so that the advantage over the prior art may not be significant. When there are more than 10 microcracks per 1 mm, the microcracks tend to become mutually connected so that the thermal cycle resistance may be poor. The number of microcracks can be determined from a sectional microstructure by measuring the number of microcracks per unit length parallel to the base material.

The thickness of the ceramic layer 23 is preferably 0.05 mm to 1.5 mm. This is because when the film thickness is 0.05 mm or less, the thermal barrier effect may be low. When the film thickness is 1.5 mm or more, the durability may be low.

The thickness of the metal binding layer may be any thickness at which the difference of thermal expansion coefficient between the base material 21 and the $ZrO_2$-based ceramic layer 23 can be lowered and thereby the thermal stress can be eased.

A method for producing the thermal barrier coating film to which the thermal barrier coating material of the invention is applied will be explained.

Figure 2:
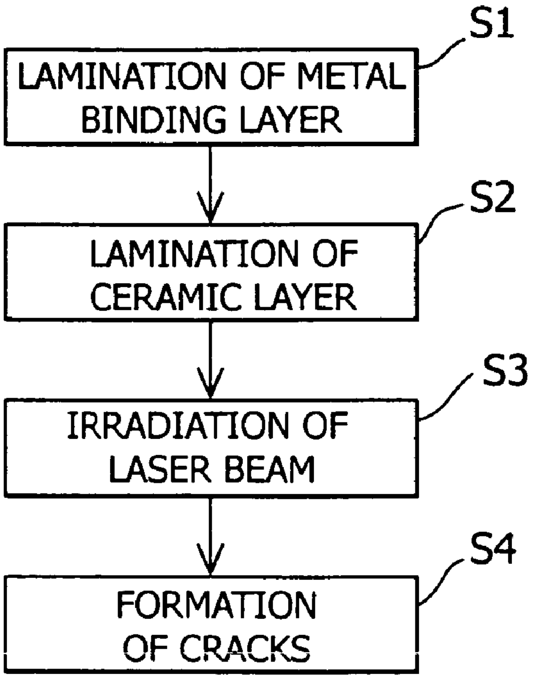
FIG. 2 is a flowchart of an example of the thermal barrier coating film production procedure according to the invention.

FIG. 2 is a flowchart of an example of the procedure for producing the thermal barrier coating film according to the invention.

Figure 3:
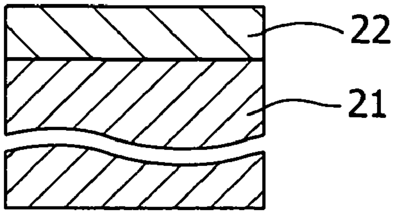
FIG. 3 is a sectional view of the thermal barrier coating film at one of the stages in the production thereof according to the first aspect of the invention.
Figure 4:
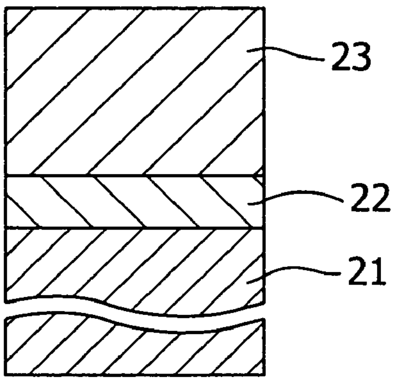
FIG. 4 is a sectional view of the thermal barrier coating film at one of the stages in the production thereof according to the first aspect of the invention.
Figure 5:
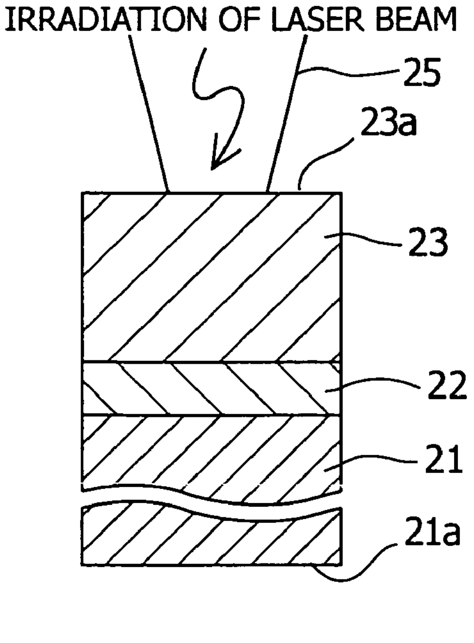
FIG. 5 is a sectional view of the thermal barrier coating film at one of the stages in the production thereof according to the first aspect of the invention.

Each of FIGS. 3 to 5 is a sectional view of one of the stages for the process for producing this thermal barrier coating film.

First, the metal binding layer 22 is laminated on the surface of the base material 21 (see step S1 and FIG. 3). Preferably, a low pressure plasma spraying or an electron beam physical vapor deposition may be used as the method for laminating the metal binding layer 22. Subsequently, the ceramic layer 23 comprising porous and partially stabilized $ZrO_2$, is laminated, for example, by thermal spraying on the surface of the metal binding layer 22 (see step S2 and FIG. 4). A vacuum heat treatment process may thereafter be performed to realize good adhesion between the bond coat and the base material.

Then, as shown in FIG. 5, while cooling the rear surface 21*a* of the base material 21, the surface 23*a* of the ceramic layer 23 is irradiated with a laser beam 25 so as to bring the surface temperature of the ceramic layer 23 to preferably 1000° C. to 1700° C. (step S3). The reasons for the preference of the temperature range are as follows. When the temperature is less than 1000° C., the number of laser irradiations may be unduly increased in order to form longitudinal microcracks and thus is poor in terms of economy. When the temperature is more than 1700° C., the ceramic layer may undergo a phase modification or sintering in a short period of time and transverse microcracks may be also caused in addition to longitudinal microcracks.

Moreover, during the laser irradiation, the laser beam diameter may be preferably adjusted to be in the range of 10 mm to 40 mm on the surface of ceramic layer 23. This is because when the laser beam diameter is less than 10 mm, it may take more time to scan the laser beam and thus be poor in economy. When the beam diameter is more than 40 mm, an unduly uneven temperature distribution in the laser spot may arise so that it may be difficult to control the forms and the number of microcracks. The laser source may include a carbon dioxide gas laser.

The number of irradiations of the laser beam 25 may be preferably in the range of 5 times to 1000 times with the proviso that there is neither a phase modification nor sintering of the partially stabilized $ZrO_2$ comprised by the ceramic layer 23. When it is less than 5 times, the laser output may have to be increased so that the surface temperature of the ceramic layer may rise significantly. When it is more than 1000 times, it may not be economical.

By irradiation of the laser beam 25, the microcracks 24 that extend in the thickness direction are caused in the ceramic layer 23 as shown in FIG. 1 (step S4 of FIG. 2) so that the thermal barrier coating film is finally attained.

The thermal barrier coating material having the above-described structure may be effectively applied to rotor and stator blades of industrial gas turbines and high temperature parts such as flame tubes and tail pipes of combustors. The thermal barrier coating material is not limited to application to the industrial gas turbines but can be used as thermal barrier coating films for high temperature parts for the engines of automobiles, jets and the like.

An embodiment of the thermal barrier coating according to the second aspect of the invention will be explained.

Figure 6:
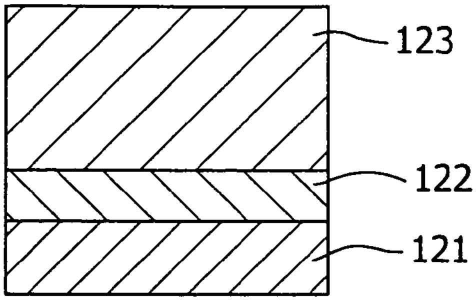
FIG. 6 is a sectional view of an example of the thermal barrier coating film according to the second aspect of the invention.

FIG. 6 is a sectional view of the thermal barrier coating film according to the invention.

The thermal barrier coating film has a structure wherein an MCrAlY alloy layer 122 is laminated as a metal binding layer of excellent corrosion resistance and oxidation resistance on a base material 121 such as a rotor blade, and a partially stabilized $ZrO_2$ layer 123 which is partially stabilized by $Dy_2O_3$ and $Yb_2O_3$ (hereinafter, referred to as $ZrO_2$—$(Dy_2O_3+Yb_2O_3)$), is laminated further on the metal binding layer as a topcoat. Herein, the M in MCrAlY represents a solitary element or a combination of two or more elements selected from Ni, Co, Fe and the like.

The MCrAlY alloy layer 122 has a role of lowering the difference of thermal expansion coefficient between the base material 121 and the $ZrO_2$—($Dy_2O_3$+$Yb_2O_3$) layer 123 and thereby eases thermal stress so that the $ZrO_2$—($Dy_2O_3$+$Yb_2O_3$) layer 123 is prevented from peeling off from the base material 121. Here, the M in MCrAlY alloy layer 122 represents a solitary element or a combination of two or more selected from Ni, Co, Fe and the like. The MCrAlY alloy layer 122 may be laminated by a low pressure plasma spraying or an electron beam physical vapor deposition.

In the $ZrO_2$—($Dy_2O_3$+$Yb_2O_3$) layer 123, the preferable portions of addition of the respective components are as follows. The $Dy_2O_3$ may be added in the range of 0.01 wt % to 16.00 wt %. The $Yb_2O_3$ may be added in the range of 0.01 wt % to 17.00 wt %. The sum of the added $Dy_2O_3$ and $Yb_2O_3$ may be in the range of 10 wt % to 20 wt %. The $ZrO_2$ may be added in the range of 80 wt % to 90 wt %. The sum of the added $Dy_2O_3$ and $Yb_2O_3$ may be preferable in the above-described ranges because when the sum is less than 10 wt %, the partial stabilization of the $ZrO_2$-based ceramic may be inadequate so that the stability at a high temperature in the long term may be poor. When the sum is more than 20 wt %, the crystal structure may change from a metastable tetragonal crystal to a structure that is mainly a cubic crystal so that the ceramic layer may be deteriorated significantly in strength and tenacity and lowered in the thermal cycle resistance. The thickness of $ZrO_2$—($Dy_2O_3$+$Yb_2O_3$) layer 123 may be preferably 0.1 mm to 1.5 mm. When the thickness is less than 0.1 mm, the thermal barrier effect may be inadequate. When the thickness is greater than 1.5 mm, the durability may be lowered significantly. The thickness of the metal binding layer may be any thickness at which the merit of lowering the difference of thermal expansion coefficient between the base material 121 and the $ZrO_2$—($Dy_2O_3$+$Yb_2O_3$) layer 123 and thereby easing thermal stress can be obtained. The thickness of the metal binding layer may be preferably in the range of 0.03 to 11.0 mm.

The $ZrO_2$—($Dy_2O_3$+$Yb_2O_3$) layer 123 may be laminated using a $ZrO_2$—$Dy_2O_3$—$Yb_2O_3$ powder by an atmospheric pressure plasma spraying or an electron beam physical vapor deposition. The $ZrO_2$—$Dy_2O_3$—$Yb_2O_3$ powder used for the atmospheric pressure plasma spraying is, for example, produced by the following procedure.

Figure 7:
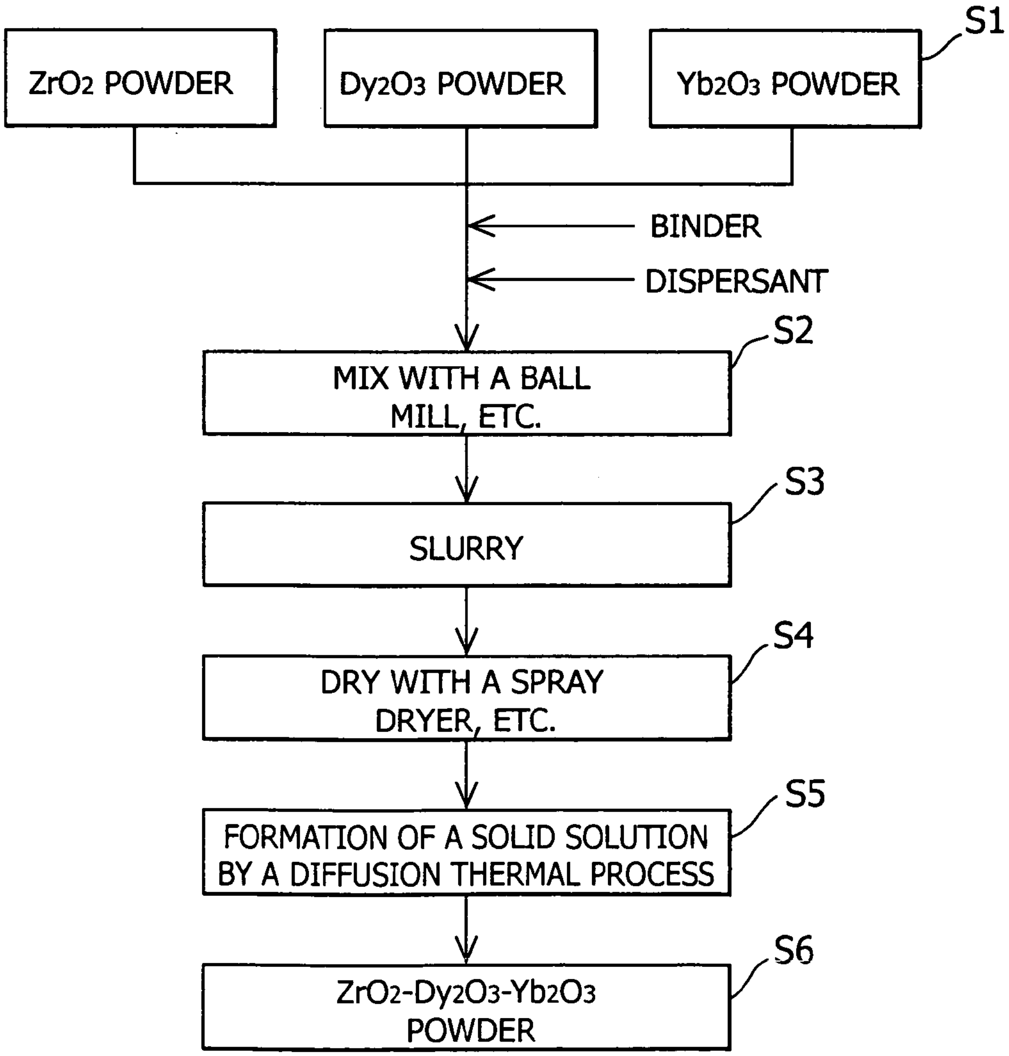
FIG. 7 is a flowchart of an example of a procedure for producing a $ZrO_2$—$Dy_2O_3$—$Yb_2O_3$ powder.

FIG. 7 is a flowchart, showing a procedure for producing a $ZrO_2$—$Dy_2O_3$—$Yb_2O_3$ powder.

First, a $ZrO_2$ powder, a predetermined amount of $Dy_2O_3$ powder and a predetermined amount of $Yb_2O_3$ powder may be prepared (step S1), mixed in a ball mill along with a suitable binder or dispersant (step S2) so as to form a slurry (step S3). The mixture may be then dried by a spray dryer so as to be in the form of granulate (step S4) and thereafter made into a solid solution by a diffusion thermal process (step S5) so as to produce a composite powder of $ZrO_2$—$Dy_2O_3$—$Yb_2O_3$ (step S6). By thermal spraying of this composite powder on the MCrAlY alloy layer 122, the thermal barrier coating film comprising the thermal barrier coating material of the invention may be obtained.

The binder to be used is not particularly limited and may include water-based and resin-based binders. The dispersant to be used may be any dispersant by which the powders can be dispersed. The mixing means is not limited to a ball mill and may include commonly used means for mixing such an attritor. The granulation means is not limited to a spray dryer and may include commonly used means such as means for fusing or a pulverizer. The ingot to be used for the electron beam physical vapor deposition may be prepared by sintering or electromelting and solidifying a raw material having predetermined composition.

The thermal barrier coating material having said structure may be effectively applied to rotor and stator blades of industrial gas turbines and high temperature parts such as flame tubes and tail pipes of combustors. The thermal barrier coating material is not limited to the application of the industrial gas turbines but can be used as thermal barrier coating films for high temperature parts for the engines of automobiles, jets and the like.

An embodiment of the TBC raw material for thermal spraying according to the third aspect of the invention will be explained.

Figure 8:
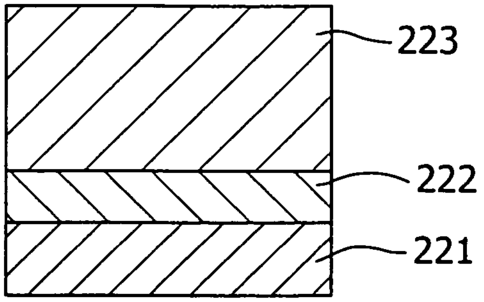
FIG. 8 is a sectional view of an example of the thermal barrier coating film according to the third aspect of the invention.

FIG. 8 is a sectional view of an example of the thermal barrier coating film prepared by thermal spraying of the TBC raw material for thermal spraying according to the invention.

The thermal barrier coating film has a structure wherein, for example, a MCrAlY alloy layer 222 is laminated as a metal binding layer of excellent corrosion resistance and oxidation resistance on a base material 221 such as a rotor blade, and a partially stabilized $ZrO_2$ which is partially stabilized by a rare earth oxide (hereinafter referred to as $ZrO_2$-rare earth oxide) layer 223, is laminated further on the metal binding layer as a topcoat. Here, the M in MCrAlY represents a solitary element or a combination of two or more elements selected from Ni, Co, Fe and the like.

The thickness of the $ZrO_2$-rare earth oxide layer 223 is preferably 0.1 mm to 1.5 mm. This is because when the layer thickness is less than 0.1 mm, the thermal barrier effect may be inadequate. When the layer thickness is greater than 1.5 mm, the durability may be lowered significantly. The thickness of the metal binding layer may be any thickness at which lowering the difference in thermal expansion coefficients between the base material 221 and the $ZrO_2$-rare earth oxide layer 223 and thereby relaxing thermal stress can be attained, and is preferably in the range of 0.03 to 11.0 mm.

The MCrAlY alloy layer 222 has a role of lowering the difference in thermal expansion coefficients between the base material 221 and the $ZrO_2$-rare earth oxide layer 223 and thereby relaxing thermal stress so that the $ZrO_2$-rare earth oxide layer 223 is prevented from peeling off from the base material 221. Herein, the M in the MCrAlY alloy layer 222 represents a solitary element or a combination of two or more elements selected from Ni, Co, Fe and the like. The MCrAlY alloy layer 222 may be laminated by a low pressure plasma spraying or an electron beam physical vapor deposition.

The $ZrO_2$-rare earth oxide layer 223 is produced by adding a zirconia powder having a specific surface area of at least 10 $m^2/g$ to a rare earth oxide powder having a specific surface area of at least 10 $m^2/g$. Herein, the specific surface area is measured by the BET method. A powder having a specific surface area of at least 10 $m^2/g$ may be equal to a powder having a mean particle diameter of submicron. Although further investigation is required because the submicron powders have greatly different features from conventional powders, it is considered that due to use of the zirconia powder of high specific surface area and the rare earth oxide powder of high specific surface area, the particles adhere together effectively and uniform mixing can be attained.

Zirconia powders having a specific surface area of at least 10 $m^2/g$ are commercially available. Presently, zirconia powders having a specific surface area as high as 50 $m^2/g$ are available and may be used favorably.

It is known that a rare earth oxide powder having a specific surface area of at least 10 $m^2/g$ can be obtained by thermal decomposition of a carbonate of a rare earth. Presently, rare earth oxide powders having a specific surface area as high as 30 $m^2/g$ are available and may be used favorably. For example, thermal decomposition of a carbonate of a rare earth such as yttrium carbonate or dysprosium carbonate at 700 to 1000° C. produces a rare earth oxide powder. When the temperature is higher than 1000° C., the particles may grow and the particle size may increase so that the specific surface may decrease. When the temperature is less than 700° C., the decomposition of the carbonate may be inadequate. Although thermal decomposition of an oxalate of a rare earth is also generally used as a method of producing a rare earth oxide, the thermal decomposition of the oxalate yields only rare earth oxides having a specific surface area of a few $m^2/g$.

Examples of preferable rare earth oxides include yttria ($Y_2O_3$), dysprosia ($Dy_2O_3$), ytterbia ($Yb_2O_3$), neodymia ($Nd_2O_3$), samaria ($Sm_2O_3$), europia ($Eu_2O_3$), gadolinia ($Gd_2O_3$), erbia ($Er_2O_3$), lutetia ($Lu_2O_3$) and may be used solitarily or as a mixture thereof. The more preferable examples include yttria, dysprosia, and ytterbia.

As for the $ZrO_2$-rare earth oxide layer 223, the content of the rare earth oxide is preferably in the range of 3 to 8 mol % and the content of $ZrO_2$ is preferably in the range of 92 to 97 mol %. This is because, within this composition range, the crystal structure is mainly of structure called a metastable tetragonal T' phase, and this structure has a high durability. When the rare earth oxide content is less than 3 moles, monocrystals may be formed in terms of crystal structure and may have a volume change in a heating or cooling process, resulting in lowered durability. When the content is more than 8 mol %, the crystal structure may become a cubic crystal and the durability may be inadequate.

The $ZrO_2$-rare earth oxide layer 223 is laminated by thermal spraying of a $ZrO_2$-rare earth oxide powder. The thermal spraying method includes commonly used methods and is not particularly limited. Examples include atmospheric pressure plasma spraying, ultrahigh-speed flame spraying and low pressure plasma spraying. The $ZrO_2$-rare earth oxide powder used for the thermal spraying may be, for example, produced by the following procedure.

Figure 9:
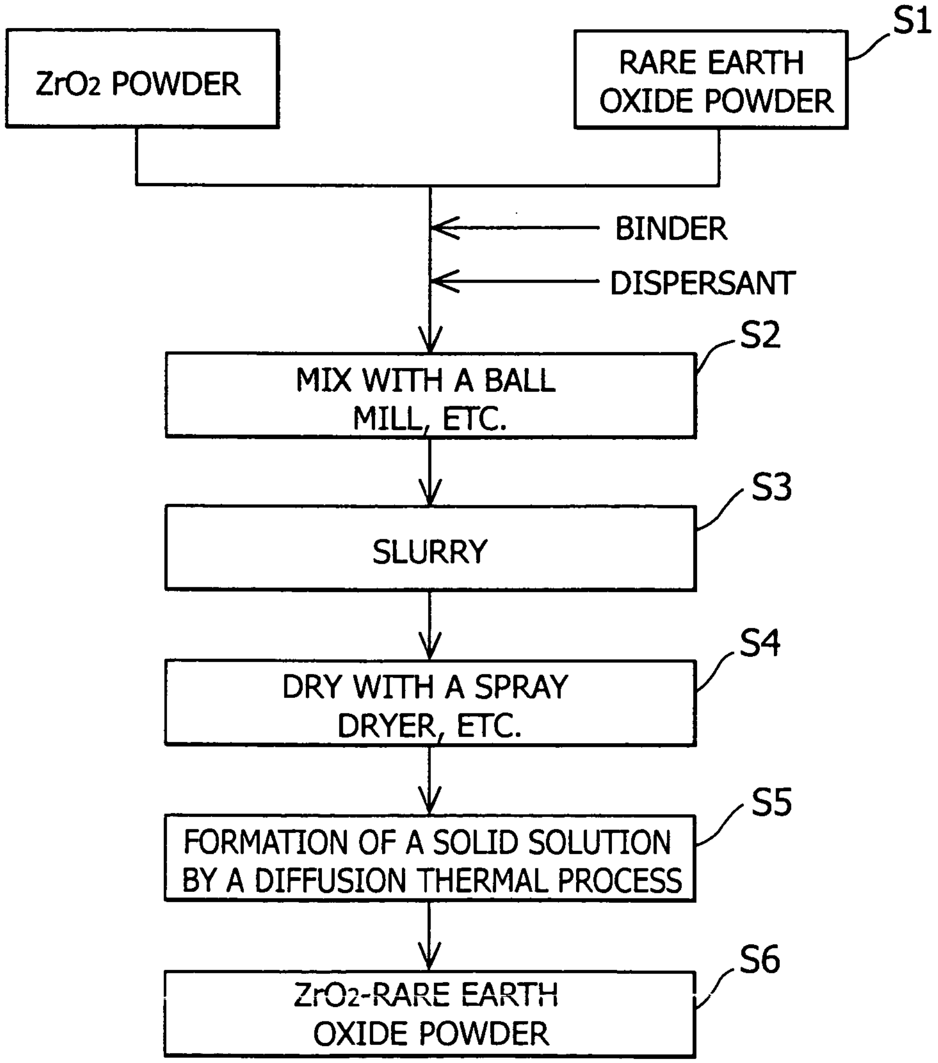
FIG. 9 is a flowchart of an example of a procedure for producing a $ZrO_2$—rare earth oxide powder.

FIG. 9 is a flowchart, showing an example of a procedure for producing a $ZrO_2$-rare earth oxide powder.

First, a $ZrO_2$ powder and a rare earth oxide powder having predetermined specific surface areas, respectively, are prepared at a predetermined ratio (step S1), placed and mixed together with a suitable binder or dispersant in a ball mill or the like (step S2), and made into a slurry (step S3). The mixture is then granulated to particles having an average particle diameter of 10 to 100 μm by a spray dryer or the like (step S4) and then heated at 1300 to 1600° C. for 1 to 10 hours (step S5) to obtain a composite powder of $ZrO_2$-rare earth oxide (step S6). Thermal spraying of this composite powder onto the MCrAlY alloy layer 222 produces the thermal barrier coating film of the invention to which the TBC raw material for thermal spraying has been applied.

The binder to be used is not particularly limited and may include water-based and resin-based binders. The dispersant to be used may be any dispersant by which the powders can be dispersed. The mixing means is not limited to a ball mill and may include an attritor and other normally used means. The granulation means is not limited to a spray dryer and may include normally used means such as means for fusing or a pulverizer.

The thermal barrier coating material with said structure may be effectively applied to rotor and stator blades of industrial gas turbines and high temperature parts such as flame tubes and tail pipes of combustors. The thermal barrier coating material is not limited to application to industrial gas turbines but can be used as thermal barrier coating films for high temperature parts for the engines of automobiles, jets and the like.

Figure 12:
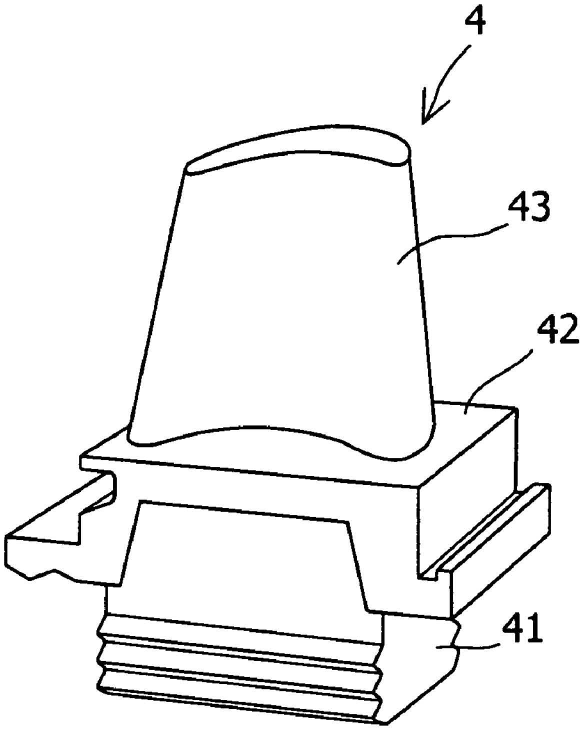
FIG. 12 is a perspective view of a gas turbine rotor blade to which the thermal barrier coating film of the invention is applied.
Figure 13:
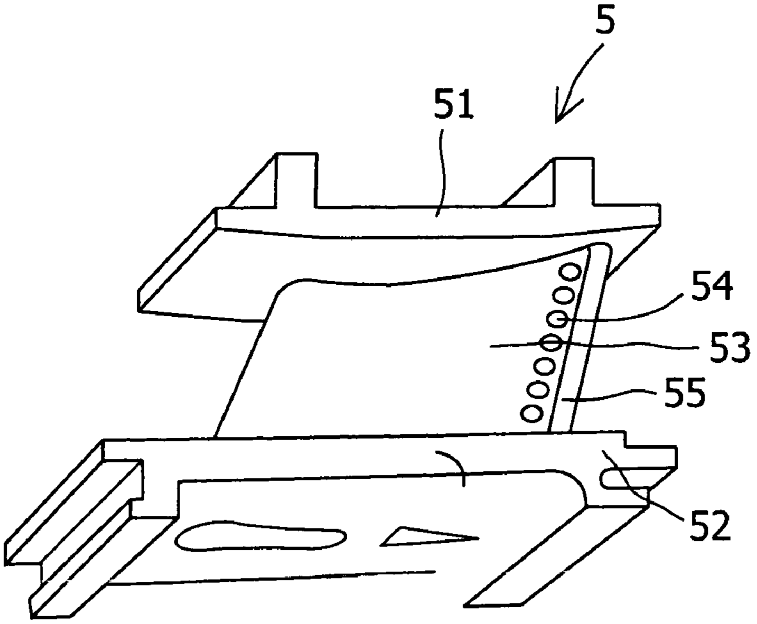
FIG. 13 is a perspective view of a gas turbine stator blade to which the thermal barrier coating film of the invention is applied.

FIGS. 12 and 13 are perspective views of turbine blades to which the thermal barrier member described in the embodiment of the first, second or third aspect of the invention is applicable.

The gas turbine rotor blade 4 in FIG. 12 is equipped with a tab tail 41 which is fixed to a disk, a platform 42, a blade part 43 and the like.

The gas turbine stator blade 5 in FIG. 13 is equipped with an inner shroud 51, outer shroud 52, blade part 53 and the like. The blade part 53 comprises seal fin cooling holes 54, slit 55 and the like.

Figure 14:
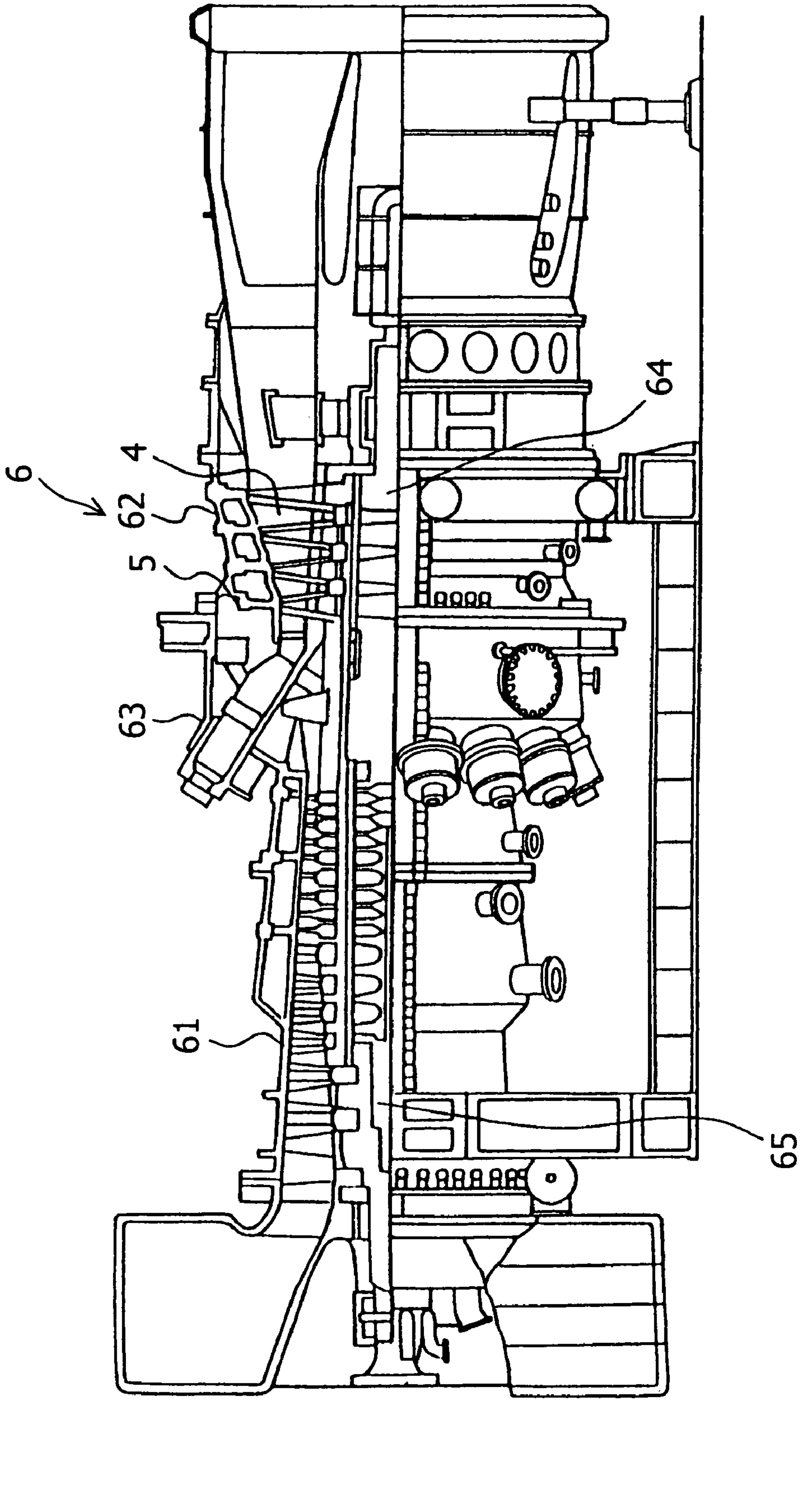
FIG. 14 is a general arrangement diagram of a gas turbine to which the thermal barrier coating film of the invention is applied.

Both gas turbine rotor blade 4 and gas turbine stator blade 5 are applicable to a gas turbine in FIG. 14.

The gas turbine in FIG. 14 will be explained briefly.

This gas turbine 6 is equipped with a compressor 61 and a turbine 62, which are directly connected to each other. The compressor 61 is arranged, for example, as an axial flow compressor and sucks in air or a predetermined gas as a working fluid from an inlet port and raises the pressure of this air or predetermined gas. A combustor 63 is connected to the discharge port of this compressor 61, and the working fluid which has been discharged from compressor 61 is heated by combustor 63 to a predetermined turbine entrance temperature. The working fluid which has been raised in temperature to the predetermined temperature is then supplied to turbine 62. As shown in FIG. 14, several (four in the Figure) of the above-described gas turbine stator blades 5 are fixed to the interior of the casing of turbine 62. Also, the above-described gas turbine rotor blades 4 are mounted to the main shaft 64 so that each rotor blade 4 forms a single stage with each stator blade 5. One end of the main shaft 64 is connected to the rotating shaft 65 of the compressor 61 and the other end is connected to the rotating shaft of an generator (not shown).

According to such a structure, when a high-temperature and high-pressure working fluid is supplied into the casing of the turbine 62 from combustor 63, the working fluid expands inside the casing to cause the main shaft 64 to rotate and thereby to drive the generator (not shown). That is, pressure is dropped by the respective stator blades 5 fixed to the casing, and the kinetic energy thereby generated is converted to rotational torque via the respective rotor blades 4 mounted to the main shaft 64. The rotational torque generated is transmitted to the main shaft 64 and the generator is thereby driven.

Typically, the material used in the gas turbine rotor blades is a heat-resistant alloy (for example, CM247LC which is an alloy material sold by Canon Muskegon Corp.) and the material used in the gas turbine stator blades is likewise a heat-resistant alloy (for example, IN939 which is an alloy material sold by Inco Corp.). That is, as the materials for the turbine blades, heat-resistant alloys which can be employed as the base materials of the thermal barrier members of the invention are used. Thus, when a thermal barrier material of the invention is coated onto a turbine blade, a turbine blade having a high thermal barrier effect and peeling resistance can be obtained. Consequently, it is applicable in environments higher in temperature, durability is improved and a long life is realized. Improvement of the gas turbine efficiency is also possible if the temperature of the working fluid is increased.

According to said embodiment of the first aspect of the invention, since the topcoat is the ceramic layer 23 which comprises the partially stabilized $ZrO_2$ which is porous and yet has the microcracks 24 that extend in the thickness direction, a higher thermal barrier effect and a higher peeling resistance than those of the prior art can be obtained. The thermal barrier coating material which is adequately durable even in the environments of higher temperatures than those of conventional temperatures, can thus be provided.

Moreover, according to the embodiment of the first aspect of the invention, since the microcracks 24 are formed in ceramic layer 23 by irradiation of the laser beam 25 after the lamination of the ceramic layer 23, the thermal barrier coating material can be produced extremely simply and at low cost. This method may also be applied selectively to only the thermally severe parts of a gas turbine member and the like.

Moreover, covering high temperature parts for a gas turbine and the like with the thermal barrier coating material can produce a gas turbine member and like which are adequately durable even in the environments of higher temperature than those of conventional temperatures.

According to the embodiment of the second aspect of the invention, since the topcoat is a layer 123 of $ZrO_2$—($Dy_2O_3$+$Yb_2O_3$) which is a composite material of DySZ and YbSZ, DySZ being higher in thermal barrier effect than YSZ, and YbSZ being higher in peeling resistance than YSZ, a higher thermal barrier effect and a higher peeling resistance than those of the prior art can be obtained. Thus, the thermal barrier coating material which is adequately durable even in the environments of higher temperature than those of conventional temperatures can be provided.

Moreover, covering high temperature parts for a gas turbine and the like with this thermal barrier coating material can produce a gas turbine member and the like which is adequately durable even in the environments of higher temperature than those of conventional temperatures.

According to the embodiment of the third aspect of the invention, since the topcoat is the $ZrO_2$-rare earth oxide layer 223 which is produced by thermal spraying of a TBC raw material for thermal spraying obtained by uniformly mixing zirconia having a specific surface area of at least 10 $m^2/g$, preferably in the range of 10 to 50 $m^2/g$, with a rare earth oxide having a specific surface area of at least 10 $m^2/g$, preferably in the range of 10 to 30 $m^2/g$, a stabilized zirconia layer with higher stability than the prior art is obtained. The thermal barrier coating material which is adequately durable even in the environments of higher temperature than those of conventional temperatures can thus be provided.

Moreover, covering high temperature parts for a gas turbine and the like with this thermal barrier coating material can produce a gas turbine member and the like which is adequately durable even in the environments of higher temperature than those of conventional temperature.

Examples and comparative examples will be described below to clarify the features of the invention.

In the respective examples and comparative examples below, a Ni-based alloy (Ni-16Cr-8.5Co-1.7Mo-2.6W-1.7Ta-0.9Nb-3.4Al-3.4Ti) was used as the base material of the heat-resistant alloy. The base material was made 30 mm square in size and 5 mm in thickness. The CoNiCrAlY (Co-32Ni-21Cr-8Al-0.5Y) was used as the metal binding layer.

EXAMPLES 1 TO 15

The sample Nos. 1 to 15 described below were prepared.

(Sample No. 1)

The surface of the base material was grid-blasted with $Al_2O_3$ particles and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 8 wt % of $Y_2O_3$ as an additive, was then formed to a thickness of 0.5 mm by atmospheric pressure plasma spraying. Then, while cooling the rear surface of the base material, the top surface of the ceramic layer was subject to 30 seconds×100 times of irradiations of a laser beam from a carbon dioxide laser. Thus, the heat cycle was repeated. In this process, the top surface of the ceramic layer was heated to a maximum temperature of 1400° C. The irradiation area per spot of the laser beam was 177 $mm^2$ (beam diameter: 15 mm). The entire sample was then cooled to room temperature.

(Sample No. 2)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 8 wt % of $Y_2O_3$ as a stabilizer, was then formed to a thickness of 0.5 mm by atmospheric pressure plasma spraying. Then, while cooling the rear surface of the base material, the top surface of the ceramic layer was heated to 1000° C. by subjecting the top surface of the ceramic layer to 30 seconds×800 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 3)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 8 wt % of $Y_2O_3$ as a stabilizer, was then formed to a thickness of 0.5 mm by atmospheric pressure plasma spraying. Then, while cooling the rear surface of the base material, the top surface of the ceramic layer was heated to 1700° C. by subjecting the top surface of the ceramic layer to 30 seconds×5 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 4)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 10 wt % of $Dy_2O_3$ as a stabilizer, was then formed to a thickness of 0.5 mm by atmospheric pressure plasma spraying. Then, while cooling the rear surface of the base material, the top surface of the ceramic layer was heated to 1400° C. by subjecting the top surface of the ceramic layer to 30 seconds×100 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 5)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 10 wt % of $Dy_2O_3$ as a stabilizer, was then formed to a thickness of 0.5 mm by atmospheric pressure plasma spraying. Then, while cooling the rear surface of the base material, the top surface of the ceramic layer was heated to 1000° C. by subjecting the top surface of the ceramic layer to 30 seconds×800 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 6)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 10 wt % of $Dy_2O_3$ as a stabilizer, was then formed to a thickness of 0.5 mm by atmospheric pressure plasma spraying. Then, while cooling the rear surface of the base material, the top surface of the ceramic layer was heated to 1700° C. by subjecting the top surface of the ceramic layer to 30 seconds×5 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 7)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 12 wt % of $Dy_2O_3$ as a stabilizer, was then formed to a thickness of 0.5 mm by atmospheric pressure plasma spraying. Then, while cooling the rear surface of the base material, the top surface of the ceramic layer was heated to 1400° C. by subjecting the top surface of the ceramic layer to 30 seconds×100 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 8)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 12 wt % of $Dy_2O_3$ as a stabilizer, was then formed to a thickness of 0.5 mm by atmospheric pressure plasma spraying. Then, while cooling the rear surface of the base material, the top surface of the ceramic layer was heated to 1000° C. by subjecting the top surface of the ceramic layer to 30 seconds×800 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 9)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 12 wt % of $Dy_2O_3$ as a stabilizer, was then formed to a thickness of 0.5 mm by atmospheric pressure plasma spraying. Then, while cooling the rear surface of the base material, the top surface of the ceramic layer was heated to 1700° C. by subjecting the top surface of the ceramic layer to 30 seconds×5 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 10)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 14 wt % of $Yb_2O_3$ as a stabilizer, was then formed to a thickness of 0.5 mm by atmospheric pressure plasma spraying. Then, while cooling the rear surface of the base material, the top surface of the ceramic layer was heated to 1400° C. by subjecting the top surface of the ceramic layer to 30 seconds×100 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 11)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 14 wt % of $Yb_2O_3$ as a stabilizer, was then formed to a thickness of 0.5 mm by atmospheric pressure plasma spraying. Then, while cooling the rear surface of the base material, the top surface of the ceramic layer was heated to 1000° C. by subjecting the top surface of the ceramic layer to 30 seconds×800 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 12)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 14 wt % of $Yb_2O_3$ as a stabilizer, was then formed to a thickness of 0.5 mm by atmospheric pressure plasma spraying. Then, while cooling the rear surface of the base material, the top surface of the ceramic layer was heated to 1700° C. by subjecting the top surface of the ceramic layer to 30 seconds×5 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 13)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 16 wt % of $Yb_2O_3$ as a stabilizer, was then formed to a thickness of 0.5 mm by atmospheric pressure plasma spraying. Then, while cooling the rear surface of the base material, the top surface of the ceramic layer was heated to 1400° C. by subjecting the top surface of the ceramic layer to 30 seconds×100 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 14)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 16 wt % of $Yb_2O_3$ as a stabilizer, was then formed to a thickness of 0.5 mm by atmospheric pressure plasma spraying. Then, while cooling the rear surface of the base material, the top surface of the ceramic layer was heated to 1000° C. by subjecting the top surface of the ceramic layer to 30 seconds×800 times of irradiations of a laser beam from a carbon dioxide laser. The irradiation area per spot of the laser beam was 177 $mm^2$ (beam diameter: 15 mmϕ). The entire sample was then cooled to room temperature.

(Sample No. 15)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 16 wt % of $Yb_2O_3$ as a stabilizer, was then formed to a thickness of 0.5 mm by atmospheric pressure plasma spraying. Then, while cooling the rear surface of the base material, the top surface of the ceramic layer was heated to 1700° C. by subjecting the top surface of the ceramic layer to 30 seconds×5 times of irradiations of a laser beam from a carbon dioxide laser. The irradiation area per spot of the laser beam was 177 $mm^2$ (beam diameter: 15 mmϕ). The entire sample was then cooled to room temperature.

Comparative Example 1

For comparison, the following Sample No. 16 was prepared.

(Sample No. 16)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A ceramic layer comprising porous and partially stabilized $ZrO_2$, which had been partially stabilized by 8 wt % of $Y_2O_3$ as a stabilizer, was then formed to a thickness of 0.5 mm by atmospheric pressure plasma spraying.

The topcoat compositions, thickness, laser irradiation conditions of Sample Nos. 1 to 15, described above, are shown in Table 1.

TABLE 1

| | Structure of TBC | | | | | | | |
|---|---|---|---|---|---|---|---|---|
| | $ZrO_2$ topcoat | | | Metal binding layer (CoNiCrAlY) | | Laser irradiation conditions | | |
| Sample No. | Stabilizer material (wt %) | thickness (mm) | Application method | thickness (mm) | Application method | Surface temperature (° C.) | Number of times (times) | Beam diameter (mm) |
| Examples | | | | | | | | |
| 1 | $Y_2O_3$ (8) | 0.5 | Atmospheric pressure plasma spraying | 0.1 | Low pressure plasma spraying | 1400 | 100 | 15 |
| 2 | $Y_2O_3$ (8) | 0.5 | Atmospheric pressure plasma spraying | 0.1 | Low pressure plasma spraying | 1000 | 800 | 15 |
| 3 | $Y_2O_3$ (8) | 0.5 | Atmospheric pressure plasma spraying | 0.1 | Low pressure plasma spraying | 1700 | 5 | 15 |
| 4 | $Dy_2O_3$ (10) | 0.5 | Atmospheric pressure plasma spraying | 0.1 | Low pressure plasma spraying | 1400 | 100 | 15 |
| 5 | $Dy_2O_3$ (10) | 0.5 | Atmospheric pressure plasma spraying | 0.1 | Low pressure plasma spraying | 1000 | 800 | 15 |
| 6 | $Dy_2O_3$ (10) | 0.5 | Atmospheric pressure plasma spraying | 0.1 | Low pressure plasma spraying | 1700 | 5 | 15 |
| 7 | $Dy_2O_3$ (12) | 0.5 | Atmospheric pressure plasma spraying | 0.1 | Low pressure plasma spraying | 1400 | 100 | 15 |
| 8 | $Dy_2O_3$ (12) | 0.5 | Atmospheric pressure plasma spraying | 0.1 | Low pressure plasma spraying | 1000 | 800 | 15 |
| 9 | $Dy_2O_3$ (12) | 0.5 | Atmospheric pressure plasma spraying | 0.1 | Low pressure plasma spraying | 1700 | 5 | 15 |
| 10 | $Yb_2O_3$ (14) | 0.5 | Atmospheric pressure plasma spraying | 0.1 | Low pressure plasma spraying | 1400 | 100 | 15 |

TABLE 1-continued

| | | | | | | | | |
|---|---|---|---|---|---|---|---|---|
| 11 | $Yb_2O_3$ (14) | 0.5 | Atmospheric pressure plasma spraying | 0.1 | Low pressure plasma spraying | 1000 | 800 | 15 |
| 12 | $Yb_2O_3$ (14) | 0.5 | Atmospheric pressure plasma spraying | 0.1 | Low pressure plasma spraying | 1700 | 5 | 15 |
| 13 | $Yb_2O_3$ (16) | 0.5 | Atmospheric pressure plasma spraying | 0.1 | Low pressure plasma spraying | 1400 | 100 | 15 |
| 14 | $Yb_2O_3$ (16) | 0.5 | Atmospheric pressure plasma spraying | 0.1 | Low pressure plasma spraying | 1000 | 800 | 15 |
| 15 | $Yb_2O_3$ (16) | 0.5 | Atmospheric pressure plasma spraying | 0.1 | Low pressure plasma spraying | 1700 | 5 | 15 |

| Sample No. | $ZrO_2$ topcoat material | Topcoat thickness (mm) | Topcoat application method | Metal binding layer thickness | Metal binding layer application method |
|---|---|---|---|---|---|
| Comparative Example | | | | | |
| 16 | $ZrO_2$ 8 wt % $Y_2O_3$ | 0.5 | Atmospheric pressure plasma spraying | 0.1 | Low pressure plasma spraying |

Figure 10:
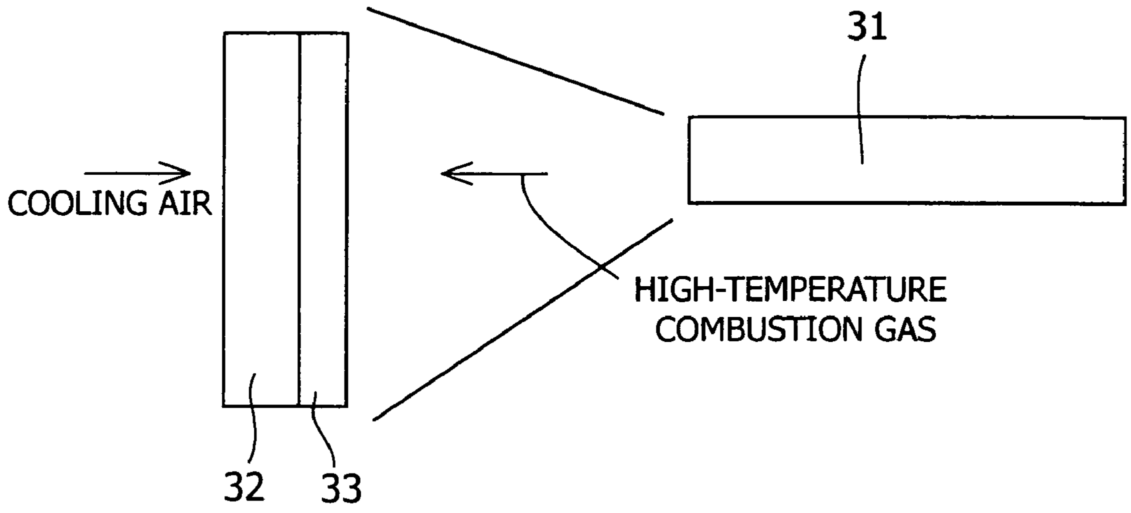
FIG. 10 is a diagram, showing an outline of the combustion gas thermal cycle test in Examples and Comparative examples.
Figure 11:
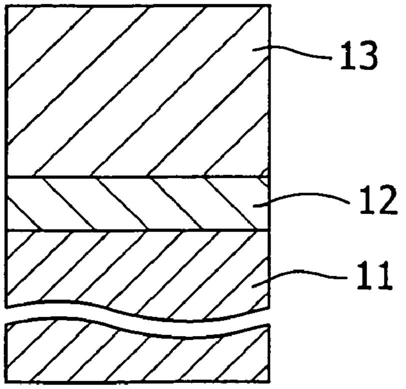
FIG. 11 is a sectional view of a conventional thermal barrier coating film.

The gas thermal cycle test device, shown in FIG. 10, was conducted on each of the above-described Sample Nos. 1 through 16. According to this device, the top surface of a thermal barrier coating film 33 of a test piece 32 can be heated to approximately 1200° C. or more by a combustion gas burner 31, and the temperature of the interface between the metal binding layer and the topcoat can be set to 800 to 900° C., which is the temperature used for an actual gas turbine.

In the durability evaluation test, the surface temperature of thermal barrier coating film 33 of each sample was heated to 1400° C. The heating pattern, in which the temperature is raised from room temperature to 1400° C. in 5 minutes, held at 1400° C. for 5 minutes, and then stopping the combustion gas to cool for 10 minutes, was set as one cycle. The temperature of a test piece upon cooling was 100° C. or less. This thermal cycle test was conducted and the durability was evaluated from the number of cycles until peeling of the topcoat occurred.

The test results are shown in Table 2.

TABLE 2

| Sample No. | Number of cycles before peeling occurred In thermal cycle test |
|---|---|
| Examples | |
| 1 | 1500 times or more |
| 2 | 1500 times or more |
| 3 | 1500 times or more |
| 4 | 1500 times or more |
| 5 | 1500 times or more |
| 6 | 1500 times or more |
| 7 | 1500 times or more |
| 8 | 1500 times or more |
| 9 | 1500 times or more |
| 10 | 1500 times or more |
| 11 | 1500 times or more |
| 12 | 1500 times or more |
| 13 | 1500 times or more |
| 14 | 1500 times or more |
| 15 | 1500 times or more |

TABLE 2-continued

| Sample No. | Number of cycles before peeling occurred In thermal cycle test |
|---|---|
| Comparative Example | |
| 16 | 475 |

It is evident in Table 2 that the peeling did not occur with any of Sample Nos. 1 to 15 of the Examples after 1500 thermal cycles. On the other hand, with Sample No. 16 of the Comparative Example, the peeling occurred at the 475th thermal cycle. It was thus confirmed that the topcoat of the porous $ZrO_2$-based ceramic layer having microcracks can bring excellent durability at higher temperatures.

For each of Sample Nos. 1 to 15 of the Examples, the porosity, density and thermal conductivity of the ceramic layer and the number of microcracks per unit length (1 mm) in the section of the ceramic layer were examined, and the results are shown in Table 3.

TABLE 3

| Sample No. | Porosity (%) | Density (g/mm) | Thermal conductivity (w/(m · K)) | Number of microcracks (cracks/mm) |
|---|---|---|---|---|
| Examples | | | | |
| 1 | 10 | 5.0 | 1.5 | 2.3 |
| 2 | 10 | 5.0 | 1.5 | 4.2 |
| 3 | 10 | 5.0 | 1.5 | 1.5 |
| 4 | 10 | 5.3 | 1.2 | 2.8 |
| 5 | 10 | 5.3 | 1.2 | 4.6 |
| 6 | 10 | 5.3 | 1.2 | 1.3 |
| 7 | 10 | 5.5 | 1.2 | 2.7 |
| 8 | 10 | 5.5 | 1.2 | 4.5 |
| 9 | 10 | 5.5 | 1.2 | 1.4 |
| 10 | 10 | 5.6 | 1.6 | 2.0 |
| 11 | 10 | 5.6 | 1.6 | 4.5 |

TABLE 3-continued

| Sample No. | Porosity (%) | Density (g/mm) | Thermal conductivity (w/(m · K)) | Number of microcracks (cracks/mm) |
|---|---|---|---|---|
| 12 | 10 | 5.6 | 1.6 | 1.6 |
| 13 | 10 | 5.8 | 1.6 | 2.2 |
| 14 | 10 | 5.8 | 1.6 | 4.2 |
| 15 | 10 | 5.8 | 1.6 | 1.2 |

EXAMPLES 1 TO 136

Sample Nos. 101 to 136, described below, were prepared.

(Sample No. 101)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-10 wt % $Dy_2O_3$-0.1 wt % $Yb_2O_3$ layer was then formed to a thickness of 0.5 mm by atmospheric pressure plasma spraying.

(Sample No. 102)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-10 wt % $Dy_2O_3$-6 wt % $Yb_2O_3$ layer was then formed to a thickness of 0.5 mm by atmospheric pressure plasma spraying.

(Sample No. 103)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-10 wt % $Dy_2O_3$-10 wt % $Yb_2O_3$ layer was then formed to a thickness of 0.5 mm by atmospheric pressure plasma spraying.

(Sample No. 104)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-12 wt % $Dy_2O_3$-0.1 wt % $Yb_2O_3$ layer was then formed to a thickness of 0.5 mm by atmospheric pressure plasma spraying.

(Sample No. 105)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-12 wt % $Dy_2O_3$-6 wt % $Yb_2O_3$ layer was then formed to a thickness of 0.5 mm by atmospheric pressure plasma spraying.

(Sample No. 106)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-12 wt % $Dy_2O_3$-8 wt % $Yb_2O_3$ layer was then formed to a thickness of 0.5 mm by atmospheric pressure plasma spraying.

(Sample No. 107)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-14 wt % $Dy_2O_3$-0.1 wt % $Yb_2O_3$ layer was then formed to a thickness of 0.5 mm by atmospheric pressure plasma spraying.

(Sample No. 108)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-14 wt % $Dy_2O_3$-4 wt % $Yb_2O_3$ layer was then formed to a thickness of 0.5 mm by atmospheric pressure plasma spraying.

(Sample No. 109)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-14 wt % $Dy_2O_3$-6 wt % $Yb_2O_3$ layer was then formed to a thickness of 0.5 mm by atmospheric pressure plasma spraying.

(Sample No. 110)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-0.1 wt % $Dy_2O_3$-12 wt % $Yb_2O_3$ layer was then formed to a thickness of 0.5 mm by atmospheric pressure plasma spraying.

(Sample No. 111)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-6 wt % $Dy_2O_3$-12 wt % $Yb_2O_3$ layer was then formed to a thickness of 0.5 mm by atmospheric pressure plasma spraying.

(Sample No. 112)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-8 wt % $Dy_2O_3$-12 wt % $Yb_2O_3$ layer was then formed to a thickness of 0.5 mm by atmospheric pressure plasma spraying.

(Sample No. 113)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-0.1 wt % $Dy_2O_3$-14 wt % $Yb_2O_3$ layer was then formed to a thickness of 0.5 mm by atmospheric pressure plasma spraying.

(Sample No. 114)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying.

A $ZrO_2$-4 wt % $Dy_2O_3$-14 wt % $Yb_2O_3$ layer was then formed to a thickness of 0.5 mm by atmospheric pressure plasma spraying.

(Sample No. 115)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-6 wt % $Dy_2O_3$-14 wt % $Yb_2O_3$ layer was then formed to a thickness of 0.5 mm by atmospheric pressure plasma spraying.

(Sample No. 116)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-0.1 wt % $Dy_2O_3$-16 wt % $Yb_2O_3$ layer was then formed to a thickness of 0.5 mm by atmospheric pressure plasma spraying.

(Sample No. 117)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-2 wt % $Dy_2O_3$-16 wt % $Yb_2O_3$ layer was then formed to a thickness of 0.5 mm by atmospheric pressure plasma spraying.

(Sample No. 118)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. A $ZrO_2$-4 wt % $Dy_2O_3$-16 wt % $Yb_2O_3$ layer was then formed to a thickness of 0.5 mm by atmospheric pressure plasma spraying.

(Sample No. 119)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-10 wt % $Dy_2O_3$-0.1 wt % $Yb_2O_3$ layer was formed to a thickness of 0.5 mm by the electron beam physical vapor deposition.

(Sample No. 120)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-10 wt % $Dy_2O_3$-6 wt % $Yb_2O_3$ layer was formed to a thickness of 0.5 mm by the electron beam physical vapor deposition.

(Sample No. 121)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-10 wt % $Dy_2O_3$-10 wt % $Yb_2O_3$ layer was formed to a thickness of 0.5 mm by the electron beam physical vapor deposition.

(Sample No. 122)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-12 wt % $Dy_2O_3$-0.1 wt % $Yb_2O_3$ layer was formed to a thickness of 0.5 mm by the electron beam physical vapor deposition.

(Sample No. 123)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-12 wt % $Dy_2O_3$-6 wt % $Yb_2O_3$ layer was formed to a thickness of 0.5 mm by the electron beam physical vapor deposition.

(Sample No. 124)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-12 wt % $Dy_2O_3$-8 wt % $Yb_2O_3$ layer was formed to a thickness of 0.5 mm by the electron beam physical vapor deposition.

(Sample No. 125)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-14 wt % $Dy_2O_3$-0.1 wt % $Yb_2O_3$ layer was formed to a thickness of 0.5 mm by the electron beam physical vapor deposition.

(Sample No. 126)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-14 wt % $Dy_2O_3$-4 wt % $Yb_2O_3$ layer was formed to a thickness of 0.5 mm by the electron beam physical vapor deposition.

(Sample No. 127)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-14 wt % $Dy_2O_3$-6 wt % $Yb_2O_3$ layer was formed to a thickness of 0.5 mm by the electron beam physical vapor deposition.

(Sample No. 128)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-0.1 wt % $Dy_2O_3$-12 wt % $Yb_2O_3$ layer was formed to a thickness of 0.5 mm by the electron beam physical vapor deposition.

(Sample No. 129)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-6 wt % $Dy_2O_3$-12 wt % $Yb_2O_3$ layer was formed to a thickness of 0.5 mm by the electron beam physical vapor deposition.

(Sample No. 130)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-8 wt % $Dy_2O_3$-12 wt % $Yb_2O_3$ layer was formed to a thickness of 0.5 mm by the electron beam physical vapor deposition.

(Sample No. 131)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-0.1 wt % $Dy_2O_3$-14 wt % $Yb_2O_3$ layer was formed to a thickness of 0.5 mm by the electron beam physical vapor deposition.

(Sample No. 132)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-4 wt % $Dy_2O_3$-14 wt % $Yb_2O_3$ layer was formed to a thickness of 0.5 mm by the electron beam physical vapor deposition.

(Sample No. 133)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-6 wt % $Dy_2O_3$-14 wt % $Yb_2O_3$ layer was formed to a thickness of 0.5 mm by the electron beam physical vapor deposition.

(Sample No. 134)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-0.1 wt % $Dy_2O_3$-16 wt % $Yb_2O_3$ layer was formed to a thickness of 0.5 mm by the electron beam physical vapor deposition.

(Sample No. 135)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-2 wt % $Dy_2O_3$-16 wt % $Yb_2O_3$ layer was formed to a thickness of 0.5 mm by the electron beam physical vapor deposition.

(Sample No. 136)

The top surface of the base material was grid-blasted with $Al_2O_3$ grains and put in a state suitable for low pressure plasma spraying. A CoNiCrAlY alloy layer was then formed to a thickness of 0.1 mm by the low pressure plasma spraying. After the CoNiCrAlY alloy layer was surface-polished to be suitable for an electron beam physical vapor deposition, a $ZrO_2$-4 wt % $Dy_2O_3$-16 wt % $Yb_2O_3$ layer was formed to a thickness of 0.5 mm by the electron beam physical vapor deposition.

Comparative Example 101

For comparison, the following Sample No. 137 was prepared.

(Sample No. 137)

A CoNiCrAlY alloy layer was formed to a thickness of 0.1 mm on the base material by low pressure plasma spraying. A $ZrO_2$-8 wt % $Y_2O_3$ layer was then formed to a thickness of 0.5 mm by atmospheric pressure plasma spraying.

Each of the Sample Nos. 101 to 137 was heated at 850° C. under vacuum for 24 hours after the film formation.

The topcoat compositions, lamination methods and thickness of Sample Nos. 101 to 137, described above, are shown in Table 4.

TABLE 4

| | Structure of TBC | | | | | | |
|---|---|---|---|---|---|---|---|
| | $ZrO_2$ topcoat | | | | | Metal binding layer (CoNiCrAlY) | |
| | Material (amount of stabilizer added to $ZrO_2$) | | | | | | |
| Sample No. | Added amount of $Dy_2O_3$ (wt %) | Added amount of $Yb_2O_3$ (wt %) | Total added amount (wt %) | thickness (mm) | Application method | thickness (mm) | Application method |
| Examples | | | | | | | |
| 101 | 10 | 0.1 | 10.1 | 0.5 | Atmospheric pressure plasma spraying | 0.1 | Low pressure plasma spraying |
| 102 | 10 | 6 | 16 | 0.5 | Atmospheric pressure plasma spraying | 0.1 | Low pressure plasma spraying |
| 103 | 10 | 10 | 20 | 0.5 | Atmospheric pressure plasma spraying | 0.1 | Low pressure plasma spraying |
| 104 | 12 | 0.1 | 12.1 | 0.5 | Atmospheric pressure plasma spraying | 0.1 | Low pressure plasma spraying |
| 105 | 12 | 6 | 18 | 0.5 | Atmospheric pressure plasma spraying | 0.1 | Low pressure plasma spraying |
| 106 | 12 | 8 | 20 | 0.5 | Atmospheric pressure plasma spraying | 0.1 | Low pressure plasma spraying |
| 107 | 14 | 0.1 | 14.1 | 0.5 | Atmospheric pressure plasma spraying | 0.1 | Low pressure plasma spraying |
| 108 | 14 | 4 | 18 | 0.5 | Atmospheric pressure plasma spraying | 0.1 | Low pressure plasma spraying |
| 109 | 14 | 6 | 20 | 0.5 | Atmospheric pressure plasma spraying | 0.1 | Low pressure plasma spraying |
| 110 | 0.1 | 12 | 12.1 | 0.5 | Atmospheric pressure plasma spraying | 0.1 | Low pressure plasma spraying |
| 111 | 6 | 12 | 18 | 0.5 | Atmospheric pressure plasma spraying | 0.1 | Low pressure plasma spraying |
| 112 | 8 | 12 | 20 | 0.5 | Atmospheric pressure plasma spraying | 0.1 | Low pressure plasma spraying |
| 113 | 0.1 | 14 | 14.1 | 0.5 | Atmospheric pressure plasma spraying | 0.1 | Low pressure plasma spraying |
| 114 | 4 | 14 | 18 | 0.5 | Atmospheric pressure plasma spraying | 0.1 | Low pressure plasma spraying |
| 115 | 6 | 14 | 20 | 0.5 | Atmospheric pressure plasma spraying | 0.1 | Low pressure plasma spraying |
| 116 | 0.1 | 16 | 16.1 | 0.5 | Atmospheric pressure plasma spraying | 0.1 | Low pressure plasma spraying |
| 117 | 2 | 16 | 18 | 0.5 | Atmospheric pressure plasma spraying | 0.1 | Low pressure plasma spraying |
| 118 | 4 | 16 | 20 | 0.5 | Atmospheric pressure plasma spraying | 0.1 | Low pressure plasma spraying |
| 119 | 10 | 0.1 | 10.1 | 0.5 | Electron beam physical vapor deposition | 0.1 | Low pressure plasma spraying |
| 120 | 10 | 6 | 16 | 0.5 | Electron beam physical vapor deposition | 0.1 | Low pressure plasma spraying |
| 121 | 10 | 10 | 20 | 0.5 | Electron beam physical vapor deposition | 0.1 | Low pressure plasma spraying |
| 122 | 12 | 0.1 | 12.1 | 0.5 | Electron beam physical vapor deposition | 0.1 | Low pressure plasma spraying |
| 123 | 12 | 6 | 18 | 0.5 | Electron beam physical vapor deposition | 0.1 | Low pressure plasma spraying |
| 124 | 12 | 8 | 20 | 0.5 | Electron beam physical vapor deposition | 0.1 | Low pressure plasma spraying |
| 125 | 14 | 0.1 | 14.1 | 0.5 | Electron beam physical vapor deposition | 0.1 | Low pressure plasma spraying |
| 126 | 14 | 4 | 18 | 0.5 | Electron beam physical vapor deposition | 0.1 | Low pressure plasma spraying |

TABLE 4-continued

| | | | | | | | |
|---|---|---|---|---|---|---|---|
| 127 | 14 | 6 | 20 | 0.5 | Electron beam physical vapor deposition | 0.1 | Low pressure plasma spraying |
| 128 | 0.1 | 12 | 12.1 | 0.5 | Electron beam physical vapor deposition | 0.1 | Low pressure plasma spraying |
| 129 | 6 | 12 | 18 | 0.5 | Electron beam physical vapor deposition | 0.1 | Low pressure plasma spraying |
| 130 | 8 | 12 | 20 | 0.5 | Electron beam physical vapor deposition | 0.1 | Low pressure plasma spraying |
| 131 | 0.1 | 14 | 14.1 | 0.5 | Electron beam physical vapor deposition | 0.1 | Low pressure plasma spraying |
| 132 | 4 | 14 | 18 | 0.5 | Electron beam physical vapor deposition | 0.1 | Low pressure plasma spraying |
| 133 | 6 | 14 | 20 | 0.5 | Electron beam physical vapor deposition | 0.1 | Low pressure plasma spraying |
| 134 | 0.1 | 16 | 16.1 | 0.5 | Electron beam physical vapor deposition | 0.1 | Low pressure plasma spraying |
| 135 | 2 | 16 | 18 | 0.5 | Electron beam physical vapor deposition | 0.1 | Low pressure plasma spraying |
| 136 | 4 | 16 | 20 | 0.5 | Electron beam physical vapor deposition | 0.1 | Low pressure plasma spraying |

| Sample No. | $ZrO_2$ topcoat material | Topcoat thickness (mm) | Topcoat application method | Metal binding layer thickness (mm) | Metal binding layer application method |
|---|---|---|---|---|---|
| Comp. ex. | | | | | |
| 137 | $ZrO_2 \cdot 8$ wt % $Y_2O_3$ | 0.5 | Atmospheric pressure plasma spraying | 0.1 | Low pressure plasma spraying |

Next, a durability evaluation test by the combustion gas thermal cycle test device, shown in FIG. 10, was conducted on each of the Sample Nos. 101 to 137. According to this device, the top surface of a thermal barrier coating film 33 of a test piece 32 can be heated to approximately 1200° C. or more by a combustion gas burner 31, and the temperature of the interface between the metal binding layer and the topcoat can be set to 800 to 900° C., which is the temperature of an actual gas turbine.

In the durability evaluation test, the surface of the thermal barrier coating film 33 of each Sample was heated to 1400° C. and the temperature of the interface between the metal binding layer and the topcoat of the thermal barrier coating film 33 was set to 900° C. The heating pattern, in which the temperature is raised from room temperature to 1400° C. in 5 minutes, held at 1400° C. for 5 minutes, and then stopping the combustion gas to cool for 10 minutes, was set as one cycle. The temperature of a test piece upon cooling was 100° C. or less. This thermal cycle test was conducted and the durability was evaluated from the number of cycles until peeling of the topcoat occurred.

The test results are shown in Table 5.

TABLE 5

| Sample No. | Number of cycles before peeling occurred in thermal cycle test |
|---|---|
| Examples | |
| 101 | 1500 times or more |
| 102 | 1500 times or more |
| 103 | 1500 times or more |
| 104 | 1500 times or more |
| 105 | 1500 times or more |
| 106 | 1500 times or more |
| 107 | 1500 times or more |
| 108 | 1500 times or more |
| 109 | 1500 times or more |
| 110 | 1500 times or more |
| 111 | 1500 times or more |
| 112 | 1500 times or more |
| 113 | 1500 times or more |
| 114 | 1500 times or more |
| 115 | 1500 times or more |
| 116 | 1500 times or more |
| 117 | 1500 times or more |
| 118 | 1500 times or more |

TABLE 5-continued

| Sample No. | Number of cycles before peeling occurred in thermal cycle test |
|---|---|
| 119 | 1500 times or more |
| 120 | 1500 times or more |
| 121 | 1500 times or more |
| 122 | 1500 times or more |
| 123 | 1500 times or more |
| 124 | 1500 times or more |
| 125 | 1500 times or more |
| 126 | 1500 times or more |
| 127 | 1500 times or more |
| 128 | 1500 times or more |
| 129 | 1500 times or more |
| 130 | 1500 times or more |
| 131 | 1500 times or more |
| 132 | 1500 times or more |
| 133 | 1500 times or more |
| 134 | 1500 times or more |
| 135 | 1500 times or more |
| 136 | 1500 times or more |
| Comparative example | |
| 137 | 475 |

It is evident in Table 5 that the peeling did not occur with any of Sample Nos. 101 to 136 of the Examples after 1500 thermal cycles. On the other hand, with Sample No. 137 of the Comparative Example, the peeling occurred at the 475th thermal cycle. It was thus confirmed that the topcoat of the $ZrO_2$—($Dy_2O_3$+$Yb_2O_3$) layer brings excellent durability at higher temperatures.

INDUSTRIAL APPLICABILITY

According to the thermal barrier coating material for the first aspect of the invention, since the topcoat is of the ceramic layer comprising partially stabilized $ZrO_2$ which is porous and yet has microcracks that extend in the thickness direction, both the high thermal barrier effect comparable to those of conventional porous thermal barrier coatings and the high peeling resistance comparable to thermal barrier coatings which can be obtained by the electron beam physical vapor deposition can be obtained. The thermal barrier coating material which provides an adequate durability even in environments of higher temperatures than those of conventional temperatures can thus be obtained.

According to the method for producing the thermal barrier coating material for the first aspect of the invention, since the longitudinal microcracks are formed in the ceramic layer by pulse irradiation of the laser beam after lamination of the ceramic layer, the thermal barrier coating material can be formed extremely simply and at low cost. This method may also be applied selectively to only the thermally severe parts of the gas turbine member and the like.

According to the gas turbine member for the first aspect of the invention, since the topcoat of the thermal barrier coating film is of a ceramic layer comprising a partially stabilized $ZrO_2$ which is porous and yet has microcracks that extend in the thickness direction, and the gas turbine member is covered with this thermal barrier coating film, the gas turbine member which provides an adequate durability even in environments of higher temperature than those of conventional temperatures can be obtained. Although the $CO_2$ gas laser was used as a method of introducing longitudinal microcracks, a plasma flame, a YAG laser, an electron beam or other heating source may obviously be used instead.

According to the gas turbine for the first aspect of the invention, the application of the coating of high durability and high thermal barrier property can bring an increase of the turbine entrance temperature of the gas turbine and a decrease of the amount of cooling air so that the thermal efficiency of the gas turbine is improved. When the coating is applied to an existing gas turbine, the lifetime of high-temperature parts can be elongated further because of the high thermal barrier effect and durability of the thermal barrier coating.

According to the thermal barrier coating material for the second aspect of the invention, since the topcoat is of a composite material of DySZ and YbSZ, DySZ being higher in thermal barrier effect than YSZ, and YbSZ, being higher in peeling resistance than YSZ, the thermal barrier effect and the peeling resistance which are higher in comparison to those of the prior art can be obtained. The thermal barrier coating material which provides an adequate durability even in environments of higher temperature than those of conventional temperatures can thus be obtained.

According to the gas turbine member for the second aspect of the invention, since the topcoat of the thermal barrier coating film is of the composite material of DySZ and YbSZ, DySZ being higher in thermal barrier effect than YSZ, and YbSZ being higher in peeling resistance than YSZ, and the gas turbine member is covered with this thermal barrier coating film, the gas turbine member which provides an adequate durability even in environments of higher temperature than those of conventional temperatures can be obtained.

According to the gas turbine for the second aspect of the invention, the application of the coating of high durability and high thermal barrier property can bring an increase of the turbine entrance temperature of the gas turbine and a decrease of the amount of cooling air so that the thermal efficiency of the gas turbine is improved. When the coating is applied to an existing gas turbine, the lifetime of high-temperature parts can be elongated further because of the high thermal barrier effect and durability of the thermal barrier coating.

According to the gas turbine member for the third aspect of the invention, since the topcoat is of the $ZrO_2$-rare earth oxide layer produced by thermal spraying of the TBC thermal spraying raw material which is obtained by mixing zirconia having a specific surface area of at least 10 $m^2/g$ and a rare earth oxide having a specific surface area of at least 10 $m^2/g$, the stabilized zirconia layer which is higher in stability than the prior art is obtained. The gas turbine member which provides an adequate durability even in environments of higher temperature than those of conventional temperatures can thus be provided.

According to the gas turbine for the third aspect of the invention, the application of the coating of high durability and high thermal barrier property can bring an increase of the turbine entrance temperature of the gas turbine and a decrease of the amount of cooling air so that the thermal efficiency of the gas turbine is improved. When the coating is applied to an existing gas turbine, the lifetime of high-temperature parts can be elongated further because of the high thermal barrier effect and durability of the thermal barrier coating.

What is claimed is:

1. A thermal barrier coating material, comprising a metal binding layer laminated on a base material and a ceramic layer laminated on the metal binding layer, the ceramic layer comprising partially stabilized $ZrO_2$ which is partially stabilized by additives of $Dy_2O_3$ and $Yb_2O_3$, wherein the ceramic layer is porous and has a porosity which ranges from 10 to 30%, and wherein said ceramic layer is a film produced by thermal spraying of a $ZrO_2$—$Dy_2O_3$—$Yb_2O_3$ powder which has been obtained from a solid solution of a mixture of $ZrO_2$, $Dy_2O_3$ and $Yb_2O_3$ powders, wherein each powder used to form said mixture has a specific surface area of at least 10 $m^2/g$.

2. The thermal barrier coating material according to claim 1, wherein said $Dy_2O_3$ is in a range of 0.01 wt % to 16.00 wt %, said $Yb_2O_3$ is in a range of 0.01 wt % to 17.00 wt %, a sum of said $Dy_2O_3$ and said $Yb_2O_3$ is in a range of 10 wt % to 20 wt %.

3. The thermal barrier coating material according to claim 2, wherein said $Dy_2O_3$ is in a range of 0.1 wt % to 4 wt %.

4. The thermal barrier coating material according to claim 2, wherein said $Dy_2O_3$ is in a range of 0.1 wt % to 2 wt %.

5. A gas turbine member, comprising the thermal barrier coating material according to claim 1.

6. A gas turbine, comprising the gas turbine member according to claim 5.

7. The thermal barrier coating material according to claim 1, wherein said $ZrO_2$ excluding stabilizers is in a range of 80 wt % to 90 wt %.

8. The thermal barrier coating material according to claim 1, wherein said ceramic layer consists of partially stabilized $ZrO_2$ which is partially stabilized only by additives of $Dy_2O_3$ and $Yb_2O_3$.

9. The thermal barrier coating material according to claim 1, wherein a density of a porous portion of said ceramic layer is in a range of 4 $g/mm^3$ to 6.5 $g/mm^3$.

10. The thermal barrier coating material according claim 9, wherein a thermal conductivity of said ceramic layer is in a range of 0.5 w/m·K to 5 w/m·K.

11. The thermal barrier coating material according claim 1, wherein a thermal conductivity of said ceramic layer is in a range of 0.5 w/m·K to 5 w/m·K.

12. The thermal barrier coating material according to claim 1, wherein the ceramic layer has microcracks that extend in a thickness direction of the ceramic layer, and the number of said microcracks per unit length (1 mm) on a section of said ceramic layer is in a range of 1 to 10.

13. The thermal barrier coating material according to claim 1, wherein the ceramic layer has a thickness of 0.05 mm to 1.5 mm.

14. The thermal barrier coating material according to claim 1, wherein the ceramic layer has a thickness of 0.1 mm to 1.5 mm.

15. The thermal barrier coating material according to claim 1, wherein said mixture is mixed with a binder or dispersant so as to form a slurry, the slurry is granulated to form particles having a mean particle diameter of 10 to 100 μm, and then the particles are heated at 1300 to 1600° C. for 1 to 10 hours.

* * * * *